Figure 1:
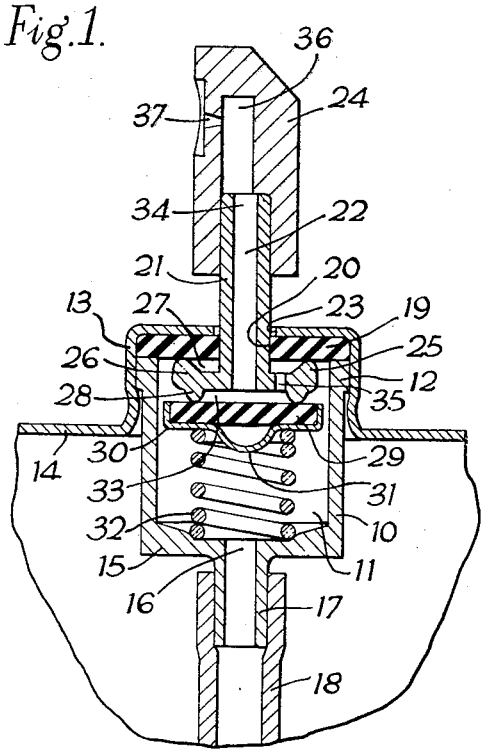

Oct. 30, 1962   R. TAGGART   3,060,965
DISCHARGE CONTROL VALVE
Filed March 7, 1960

INVENTOR
REGINALD TAGGART
BY Irwin J. Thompson
ATTY.

United States Patent Office 3,060,965
Patented Oct. 30, 1962

3,060,965
DISCHARGE CONTROL VALVE
Reginald Taggart, Tettenhall, England, assignor to Specialty Valves Limited, Wolverhampton, England, a British company
Filed Mar. 7, 1960, Ser. No. 13,215
Claims priority, application Great Britain July 13, 1959
2 Claims. (Cl. 137—599.2)

This invention relates to discharge control valves for pressurized containers, frequently known as "aerosol" type dispensers and comprising a pressure-tight container for holding a fluid substance to be dispensed together with a pressure generating medium such as a compressed gas or a fluid material, e.g. Freon, and a manually operable discharge valve sealed to the container for permitting release of the container contents in the form of a jet or spray.

Such discharge control valves usually comprise a movable valve member in the form of a tubular stem having a disc-like part disposed normal to the stem axis at one end, such disc-like part being provided with at least one valve seating surface thereon for co-operation with a resilient sealing ring surrounding the valve stem and carried by the stationary portion of the valve structure and arranged so as to permit fluid flow from within the container past such seating surface and then through a radial transfer port in the wall of the valve stem to the bore of the latter when the valve member is moved either axially or is tilted sideways.

The present invention is more particularly concerned with valves of the above general type and which are operable by a tilting movement, usually known as "tilt-type" valves. By reason of such tilting valve-operating movement of the valve member, there is very little, if any, axial movement of the valve stem through the associated resilient sealing ring and it becomes necessary to form the disc-like part of dished or recessed form on the side thereof facing the sealing ring and to locate the transfer port through the stem wall at a position which is within such dished or recessed region. This makes the formation of the port a matter of considerable difficulty involving an awkward angular drilling operation. While drilling is practicable with a valve member made of metal, it is unsatisfactory when such valve member is formed of moulded plastic material. Direct moulding of the required port in a moulded type valve member has not been found reasonably possible.

An object of the present invention is to provide an improved form of tilt-type discharge valve by which the construction of the required transfer port is facilitated and which, moreover, permits the direct formation of such port during the moulding of a valve member formed of moulded plastic material.

According to the present invention, a discharge control valve for a pressure filled container comprising a movable valve member having a tubular stem which is provided with a disc-like part disposed normal to the stem axis at one end thereof, said disc-like part having a valve seating surface thereon arranged for co-operation with a resilient sealing ring surrounding the valve member stem to provide for valve opening by tilting movement of the valve stem relative to said sealing ring, has said disc-like part provided intermediate the adjaecnt end of the bore of said tubular stem and said seating surface with a wall region lying in a plane substantially normal to the stem axis and with means defining a normally-closed chamber on the side of said disc-like part opposite to that of said valve seating surface together with at least one transfer port in said wall region between said chamber and the opposite surface of said disc-like part carrying said seating surface to permit fluid communication past said seating surface and through said port to said chamber and thence to the bore of the tubular stem when the valve member is tilted.

Figure 2:
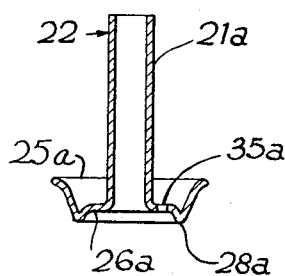

In order that the nature of the invention may be more readily understood, embodiments thereof will now be described with reference to the accompanying drawing, in which:

FIG. 1 is an axial cross-section through one form of control valve embodying the invention, while FIG. 2 is an axial section through an alternative form of movable valve member constructed of metal.

Referring first to FIG. 1, the discharge valve shown comprises a main valve body 10 of tubular form and defining an internal chamber 11. This valve body 10 is provided with an enlarged diameter circumferential flange 12 around its outer end, said flange being a snug sealing fit within the interior of a central projecting cupped portion 13 of a sheet metal valve cup 14, only a part of which is shown. At the opposite end, the valve body 10 is closed by a radial end wall 15 having a central aperture 16 connecting with an integral tubular extension 17 upon the opposite lower end of which is secured the upper end of the customary dip tube 18 extending towards the bottom of the associated pressure-tight container, not shown.

Between the upper end of the valve body 10 and the top wall of the cupped portion 13 is located a resilient sealing ring 19 whose central bore 20 embraces and seals the stem 21 of a movable valve member indicated generally at 22. The aforesaid valve body 10 is held in tight sealing engagement with the sealing ring 19 and the latter in similar engagement with the cupped portion 13 by suitable indentation or clinching of the cup wall underneath the enlarged diameter flange 12.

The movable valve member 22 has its tubular stem 21 extending outwardly through the sealing ring 19 and a clearance aperture 23 in the cupped region 13 for the reception upon its outer end of an operating knob 24. The inner end of the stem 21, disposed within the chamber 11, is provided with an integral disc-like part 26 of annular form around the outer circular edge of which on the side facing towards the sealing ring 19 is provided a projecting rib 25 adapted to form a valve seating surface for co-operation with the inner surface of the sealing ring 19. Due to the projection of this rib 25 there is formed an annular chamber 27 surrounding the inner end of the valve stem. A further concentric circular projecting rib 28 on the opposite side of the disc-like part 26 serves to provide a second valve seating surface which is normally in sealing engagement with a sealing disc 29 mounted in a sheet metal cup 30 having a central downwardly directed protuberance 31 for locating one end of a helical spring 32 whose opposite end is seated by appropriate shaping of the end wall 15. The aforesaid second rib 28 in conjunction with the sealing disc 29 defines a second chamber 33 below the disc-like part 26 of the valve member 22 and this chamber 33 is in continuous fluid communication with the bore 34 of the valve stem 21. Between the bore 34 and said second rib 28 the disc-like part 26 has the form of an annular wall lying in a plane normal to the axis of the stem 21 and in this annular wall part there is provided a transfer port 35 providing direct communication between the two chambers 27 and 33.

The operating knob 24 is shown in the form of a moulded member having an internal passageway 36 extending from the end of the valve stem 21 to a discharge port 37 formed in the side of the knob.

In operation of the valve, tilting movement of the valve stem 21 by applied sideways pressure on the operating knob 24 breaks the sealing connection between the seating surface on the rib 25 and the underside of the sealing ring 19 thereby allowing fluid communication between the interior of the pressure-tight container through the dip tube 18 and chamber 11 past the rib 25 into the chamber 27 and thence through the transfer port 35 into the further chamber 33 and so by way of the bore 34 of the tubular stem 21 to the discharge orifice 37.

The location of the transfer port 35 in the annular wall normal to the stem axis permits the construction of the valve member 22 as a plastic moulding with transfer port 35 formed during the moulding operation.

The particular valve shown is one adapted for rapid filling under pressure after sealing of the discharge valve to the container. By connecting a suitable pressurised filling source directly to the outer end of the valve stem 21 prior to application of the knob 24, the sealing disc 29 is displaced downwardly to permit fluid flow directly into the container past the rib 28.

An alternative form of movable valve member 22 made of metal is shown in FIG. 2 where the tubular stem 21a is first flanged rapidly outwards at its inner end to form an annular wall part 26a. The outer margin of this is then first turned slightly downwardly and then upwardly again to form a circular sealing rib 28a for use in defining the chamber lying below the flange. The upwardly turned free edge zone of this margin is then extended upwardly for some distance past the level of the wall part 26a and is then preferably flared radially outwards to some extent so as to form the circular seating surface 25a coaxial with the valve stem. The transfer port 35a is then drilled in the radial wall part 26a without difficulty.

It will be appreciated that other forms of valve member may be devised within the scope of the invention and that more than one transfer port may be provided.

I claim:

1. A discharge control valve for a pressure filled container comprising a movable valve member having a tubular stem which is provided with an integral disc-like valve head disposed normal to the stem axis at its lower end, said disc-like valve head comprising an annular wall part extending radially outwards from the lower end of said stem, the central bore of said tubular stem continuing through said valve head, a first axially projecting circumferential rib around the peripheral edge of said annular wall part on the side thereof facing said stem to form a first valve seating surface, a resilient sealing ring surrounding said stem of said valve member and arranged for co-operation with said first valve seating surface to provide for valve opening to effect discharge of the container contents by tilting movement of the valve stem relative to said sealing ring, a second axially projecting circumferential rib concentric with said first rib on the opposite side of said annular wall part to form a second valve seating surface, said second rib lying at a radius from the stem axis greater than the radius of said bore to provide an annular platform in a plane normal to the axis of said stem between said bore and said second rib, a resilient valve sealing member, spring means holding said valve sealing member normally in sealing contact with said second valve seating surface to define a chamber which is in fluid communication with said stem bore on the side of said disc-like valve head opposite to that of said stem and said first valve seating surface, and at least one axially directed transfer port through the thickness of said annular platform between said chamber and the opposite surface of said annular wall part carrying said first valve seating surface to permit outward fluid flow from the container past said first seating surface and through said port to said chamber and thence to the bore of the tubular stem when the valve member is tilted while allowing direct inward fluid flow into the container by a path avoiding said transfer port by displacement of said resilient valve sealing member from sealing contact with said second valve seating surface.

2. A discharge control valve for a pressure filled container comprising a one-piece movable valve member of moulded plastic material having a tubular stem which is provided with a disc-like valve head disposed normal to the stem axis at its lower end, said disc-like valve head comprising an annular platform region extending radially outwards from the lower end of said stem, the central bore of said tubular stem continuing through said valve head, said platform lying in a plane normal to the axis of said stem, a first axially projecting circumferential rib integral with and around the peripheral edge of said annular platform region on the side thereof facing said stem to form a first valve seating surface, a second axially projecting circumferential rib integral with and around the peripheral edge of said annular platform region on the side thereof opposite said first rib to form a second valve seating surface, a resilient sealing ring surrounding said stem of said valve member and arranged for co-operation with said first valve seating surface to provide for valve opening by tilting movement of the valve stem relative to said sealing ring, a resilient valve sealing disc, spring means holding said valve sealing disc in sealing contact with said second valve seating surface and said first valve seating surface in sealing contact with said resilient sealing ring, said sealing disc serving to define a chamber on the side of said valve head opposite to that of said first valve seating surface and which is in fluid communication with said stem bore, and at least one axially directed transfer port through said annular platform region between said chamber and the opposite surface of said valve head within the region defined by said first valve seating surface to permit outward fluid flow from the container past said first valve seating surface and through said port to said chamber and thence to the bore of the tubular stem when the valve member is tilted while providing a direct inward flow path into the container avoiding said transfer port by displacement of said valve sealing disc from sealing contact with said second valve seating surface.

References Cited in the file of this patent
UNITED STATES PATENTS

| | | |
|---|---|---|
| 2,709,111 | Green | May 24, 1955 |
| 2,731,298 | Green | Jan. 17, 1956 |
| 2,889,086 | Collins | June 2, 1959 |
| 2,913,154 | Kuffer | Nov. 17, 1959 |